United States Patent [19]
Shaffer et al.

[11] Patent Number: 5,687,608
[45] Date of Patent: Nov. 18, 1997

[54] CONNECTOR FOR CONCENTRIC TUBES ATTACHED TO A FUEL GAUGE

[75] Inventors: Howard Richard Shaffer, Millersburg; William Jesse Rudy, Jr., Annville; Daniel Eugene Stahl, Hummelstown, all of Pa.

[73] Assignee: The Whitaker Corporation, Wilmington, Del.

[21] Appl. No.: 410,191

[22] Filed: Mar. 24, 1995

[51] Int. Cl.[6] ............................................. G01F 23/26
[52] U.S. Cl. ....................... 73/304 C; 340/620; 439/32
[58] Field of Search ........................... 73/240 R, 295, 73/304 C; 116/227; 340/615, 618, 619, 620, 622; 439/32, 191; 324/690, 664; 361/284

[56] References Cited

U.S. PATENT DOCUMENTS

| | | | |
|---|---|---|---|
| 2,560,757 | 7/1951 | Bowar | 361/284 |
| 2,699,523 | 1/1955 | Meyers | 73/304 C |
| 2,759,134 | 8/1956 | Sullivan | 361/284 |
| 3,167,695 | 1/1965 | Bronson | 73/304 C |
| 3,798,515 | 3/1974 | DiGiacomo | 73/304 C |
| 4,281,542 | 8/1981 | Wallman | 73/304 C |
| 4,888,989 | 12/1989 | Homer | 73/304 C |
| 5,129,844 | 7/1992 | Goto et al. | 439/778 |
| 5,236,377 | 8/1993 | Goto | 439/779 |

*Primary Examiner*—William A. Cuchlinski, Jr.
*Assistant Examiner*—Andrew Hirshfeld
*Attorney, Agent, or Firm*—Anton P. Ness

[57] ABSTRACT

A connector for a fuel gauge in a fuel cell which has an inner tube (12) and a spaced-apart concentric outer tube (14). A housing assembly (16) is mountable to outer tube (14) and includes a contact (19) electrically connected to the outer tube. A sleeve assembly (25) is slidably mounted in a bore (24) in the housing assembly and extends through an opening (29) through the outer tube, and a first end (32) of a contact assembly (26) within sleeve assembly (25) extends through an opening (35) in the inner tube and self-secures thereto. The contact assembly of the sleeve assembly makes electrical contact with the inner tube (12) at opening (35) and is connected at second end (33) by an electrical lead to the fuel gauge. An electrical lead also connects contact (19) connected to outer tube (14), to the fuel gauge so that an electrical potential between the inner tube and the outer tube may be measured.

13 Claims, 6 Drawing Sheets

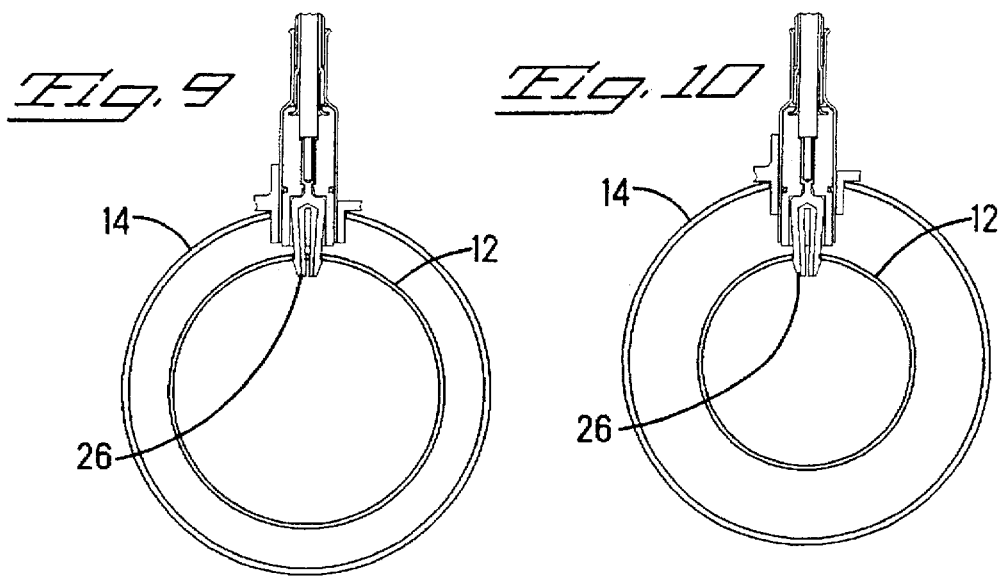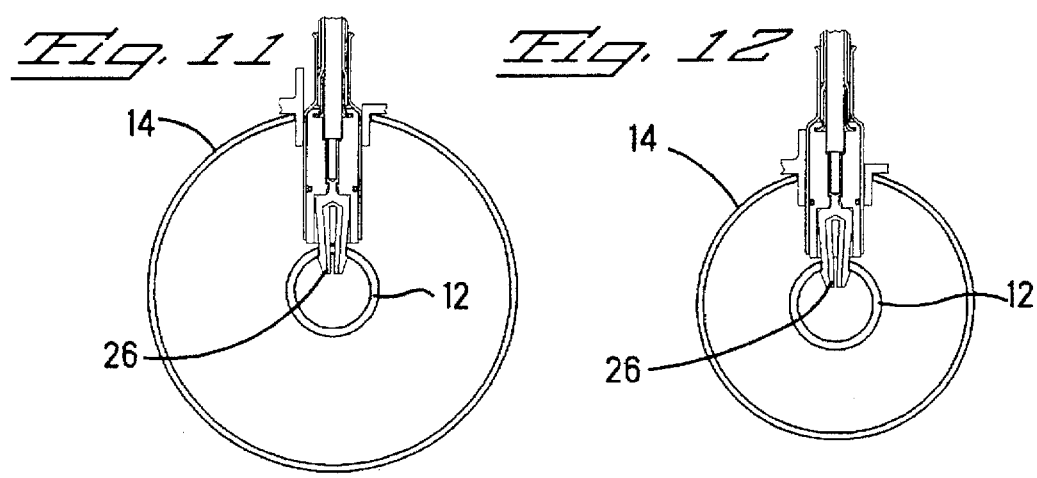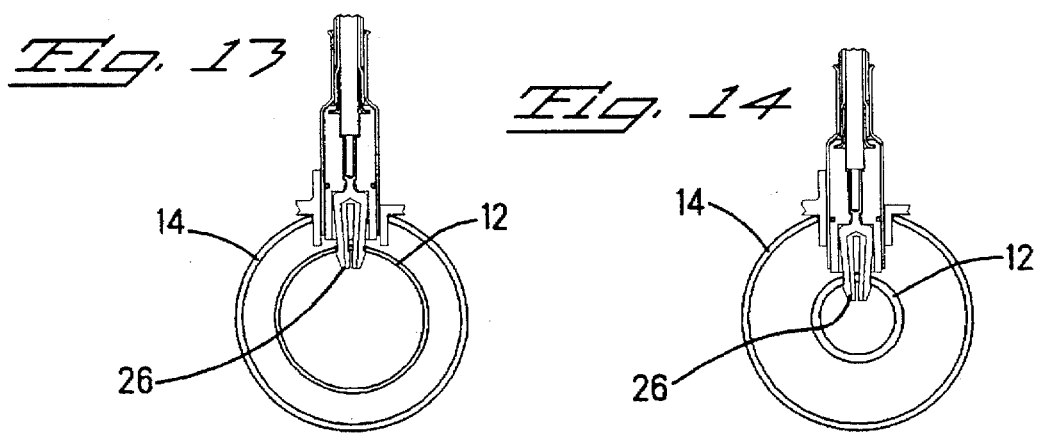

ial signal from the tubes to a fuel gauge.

5,687,608

CONNECTOR FOR CONCENTRIC TUBES ATTACHED TO A FUEL GAUGE

FIELD OF THE INVENTION

The present invention relates to a connector for concentric tubes and more particularly for transmitting an electrical signal from the tubes to a fuel gauge.

BACKGROUND ART

There is frequently a need to transmit electrical signals from two concentric tubes to a measuring device. One particular application is in an aircraft where the amount of fuel in a cell is determined by measuring the capacitance between the two concentric tubes which extend into the fuel cell. There are a plurality of cells on any single aircraft. Depending upon the type of aircraft and the nature and size of the cells containing fuel, the concentric tubes may be of varying diameters and the spacing between the tubes may vary. Also, any set of concentric tubes may be bent and have differing diameters and different spacing between the tubes. Connectors are known that have a frame mounted on the outer tube with an arcuate shield member between the frame and the arcuate outer surface of the outer tube and spaced therefrom. The arcuate shield member reduces stray capacitance between connector wires and is complementary to the outer tube having a limited range of curvature resulting in the need to have a series of connectors depending upon the degree of curvature of the outer cylinder. The inner tube is also connected through an opening in the outer tube. Electrical leads from the set of inner and outer tubes are brought to terminals on the frame for subsequent connection to the fuel gauge. The frame and connectors are bulky requiring space for mounting and access. This contributes to additional weight in an environment where weight and space are major design considerations.

Thus, there is a need for a simple, compact connector for a fuel gauge which can be used with concentric tubes of varying diameters and of varying space between the tubes. The connector must be capable of being retrofit on existing tubes.

SUMMARY OF THE INVENTION

The present invention provides a small and lightweight connector for a fuel gauge in a fuel cell, and that can be used with concentric tubes of varying sizes and diameters.

In accordance with the teaching of the present invention, there is disclosed a connector for a fuel gauge in a fuel cell, where the fuel gauge is of the type having an inner tube and a spaced-apart concentric outer tube, to connect electrical leads to the respective tubes. Each tube has, respectively, an inner wall and an outer wall, and a respective spacing formed between the walls of each tube. The connector includes a housing assembly having a bore formed therein and has a sleeve assembly slidably mounted in the bore and extending through the opening of the outer tube. A contact of the housing assembly electrically engages the outer tube. A contact assembly within the sleeve assembly has a first end and an opposite second end, with the first end extending from the bore and having engaging means thereon received in an opening in the inner tube and forming an electrical contact with the inner tube. The second end of the contact assembly is electrically connected to the fuel gauge. An electrical lead has a first end and a second end with the first end electrically connected to the outer tube and the second end electrically connected to the fuel gauge. In this manner, the fuel gauge may measure an electrical signal between the inner tube and the outer tube.

An embodiment of the present invention will now be described by way of example with reference to the enclosed drawings.

BRIEF DESCRIPTION OF THE DRAWINGS

FIGS. 9–14 are a series of cross sections showing the connector with varying diameters of inner and outer tubes with varying spaces between the tubes.

DESCRIPTION OF THE PREFERRED EMBODIMENT

Figure 1:
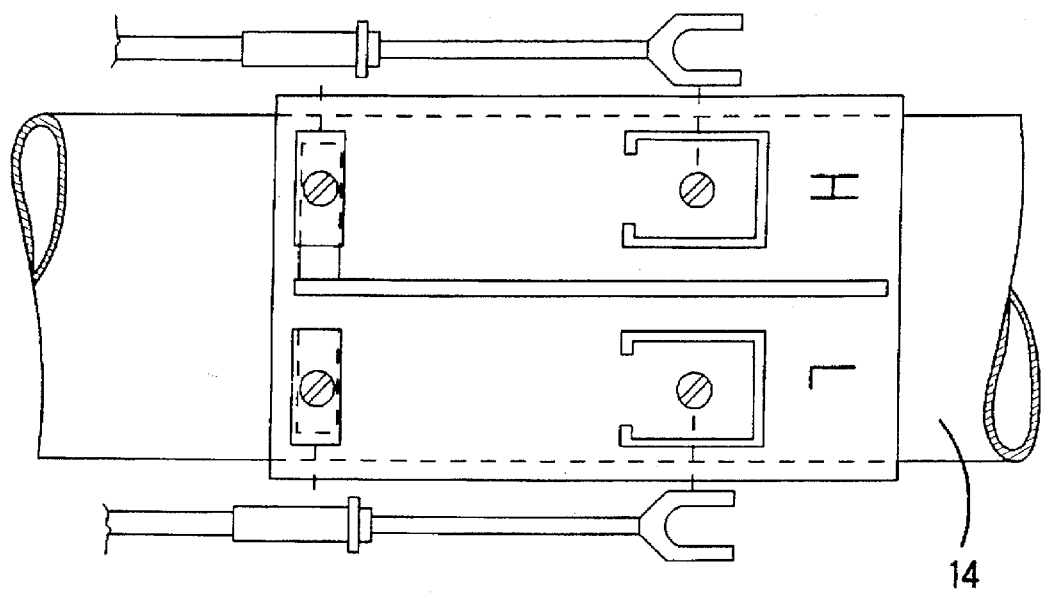
FIG. 1 is a side view showing the prior art arrangement having a frame to mount a terminal board and a shield member to the outer tube.
Figure 2:
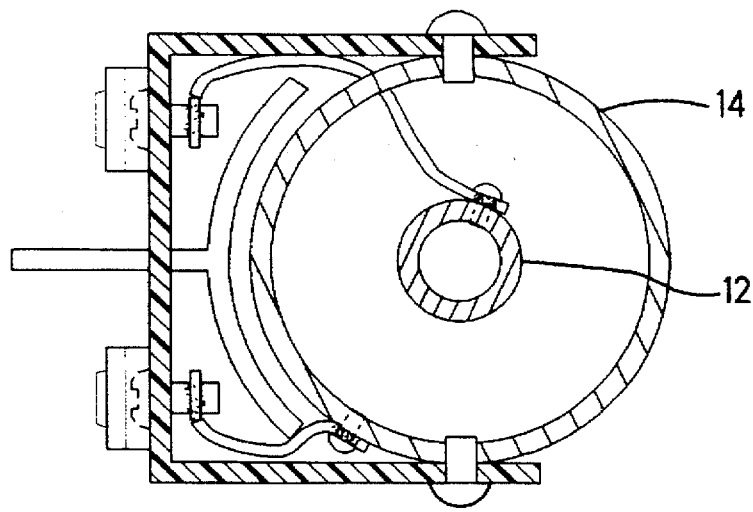
FIG. 2 is an end view of the prior art arrangement of FIG. 1 showing a lead to the inner tube and the curved shield member mounted adjacent to the outer tube and held in place by the frame.

The present invention finds particular application in an aircraft in which the fuel is stored in cells which may exceed thirty in number and it is necessary for the pilot to know the amount of fuel remaining. Referring first to the prior art arrangement of FIGS. 1 and 2, a pair of concentric tubes are disposed in each fuel cell and the volume of fuel in each cell affects the capacitance between the inner tube 12 and the outer tube 14. The capacitance is measured on a fuel gauge (not shown) to which each pair of tubes is connected electrically. A telescoping tubular subassembly (also not shown) is affixed to the end of the shorter outer tube of each tube pair to be adjusted to increase or decrease the effective length of the outer tube with respect to the longer inner tube extending therebeyond to tune the circuit of the particular tube pair. In the prior art arrangement (FIGS. 1–2), a frame of dielectric material is secured to each outer tube and electrical leads are connected to outer tube 14 and to the inner tube 12 from screws secured to the frame. An inner conductor of a coaxial lead has a spade terminal terminated thereto and is connected to the electrical lead for the inner tube 12 at a connecting screw, while a single-conductor lead is connected in similar fashion to the electrical lead for the outer tube 14, and both the coaxial and single-conductor leads are clamped to the frame spaced from the connections with the electrical leads. Rearwardly of the clamps, the coaxial and single-conductor leads may be grouped together for handling and routing, preferably within an outer jacket such as heat-recoverable tubing.

An arcuate conductive shield member is disposed adjacent to the outer tube 14 and spaced therefrom a limited distance, such as one-quarter inch; a securing bar extends from a vertical rib of the shield member to the clamps and also serves to ground the shield member to the outer conductor of the coaxial cable at its clamp. The curvature (or outer diameter) of the outer tube must be complementary to the curvature (or inner diameter) of the arcuate section of the shield member spaced slightly therefrom, and the frames and outer tubes of each of the tube pairs must have corresponding sizes in order to attach the frame and have a satisfactory electrical contact. Thus, a wide variety of frames and arcuate members must be available. The frame, although made of plastic and aluminum, contributes additional weight to the aircraft, especially considering the number of connectors which are required.

The present invention in FIGS. 3 to 8 has a housing assembly 16 connected to the outer wall 18 (FIG. 7) of the outer tube 14. Preferably, the housing assembly 16 is firmly secured to the outer tube 14 by riveting to prevent movement of the housing assembly 16 due to vibrations produced during flight of the aircraft.

Figure 4:
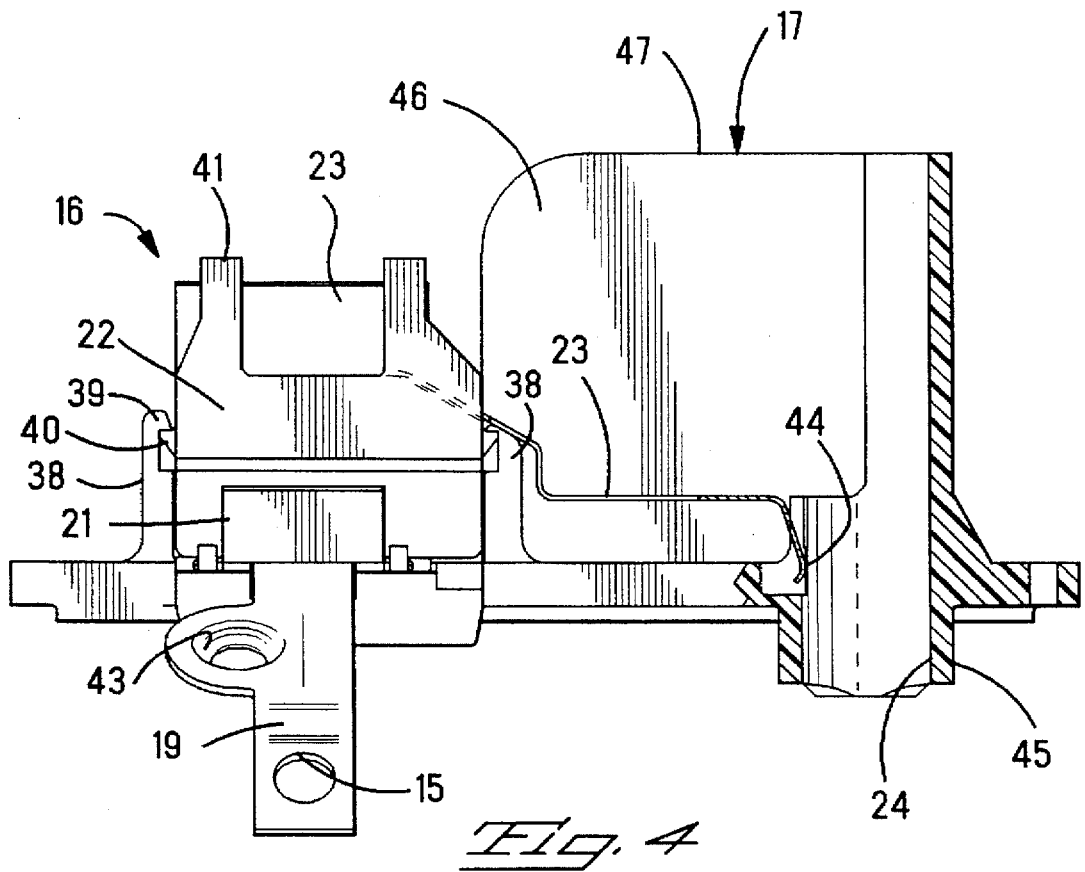
FIGS. 4 and 5 are side and front elevation views respectively of the housing assembly of the present invention.
Figure 5:
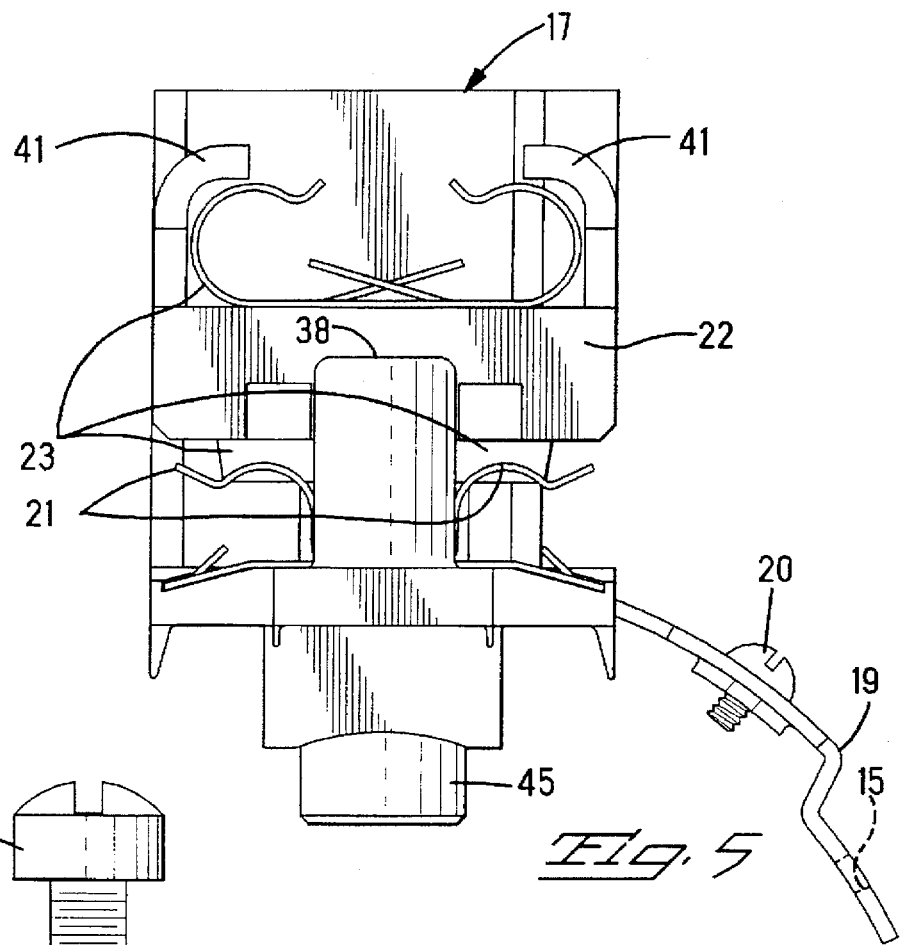
Figure 7:
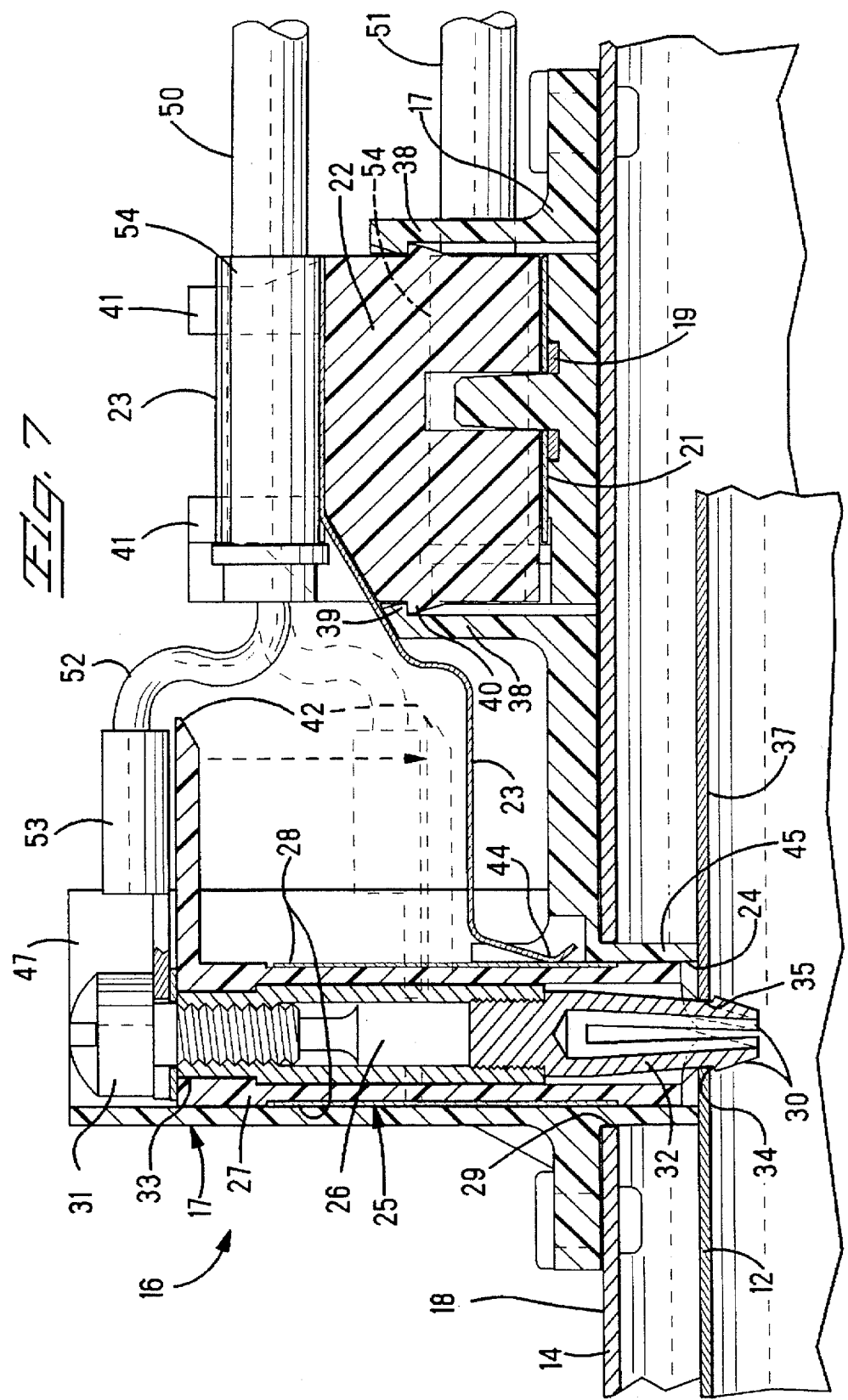
FIG. 7 is a side elevation view with a partial cross section showing the sleeve assembly disposed in the housing assembly of the present invention and respectively attached to the inner tube and to the outer tube.

The housing assembly 16 is composed of several parts. One part is a plastic frame 17 that supports the other parts. A second part is the outer tube contact 19 which is electrically conductive and is in electrical engagement with outer tube 14 at hole 15 such as by riveting, and also has an end which is retained in the plastic frame 17. The outer tube contact 19 has a threaded opening 43 formed externally of the plastic frame 17 and a screw 20 is received thereinto, by which an electrical cable 51 (in phantom) is connected to outer contact 19, to extend from the screw 20 to the fuel gauge. A third part is conductive retention clip 21 which is in physical and electrical contact with the outer tube contact 19 (as seen in FIG. 7). The retention clip 21 is retained in the housing assembly 16 by a fourth part, the retainer insert 22. The retainer insert 22 is preferably formed from plastic and may be affixed to plastic frame 17 by being snapped between opposed wall sections 38 using cooperating latches 39,40 (FIGS. 4 and 7). A fifth part, another conductive retention clip 23 is snapped into the retainer insert 22 under fingers 41 thereof. It is seen in FIG. 5 that each of retention clips 21,23 includes a pair of lead-receiving sections, one along each side of the insulative frame, enabling securing a respective lead thereinto from either side of the frame.

A bore 24 is formed in the housing assembly 16 such that when the housing assembly 16 is secured to the outer tube 14, the bore 24 is approximately perpendicular to the outer tube 14. A sleeve assembly 25 (FIG. 6) is disposed in the bore 24 and consists of a contact assembly 26, an insulating sleeve 27 and a shielding jacket 28, all bonded together. The insulating sleeve 27 is preferably formed from a non-conducting plastic material. The shielding jacket 28 is preferably formed from stainless steel. Copper containing alloys are avoided because of the partial solubility of said alloys in fuel which tends to clog filters in the fuel system. The contact assembly 26 has an engaging means at one end as will be described, and a connection screw 31 at an opposite end. The sleeve assembly 25 is frictionally movably within the bore 24 in the housing assembly 16 and at any eventual position (as shown in phantom in FIG. 7), spring arm 44 of the retention clip 23 in the housing assembly 16 remains in electrical engagement with the shielding jacket 28 for grounding the cable shield. It is preferred that the conductive retention clip 23 have a body section extending from retainer insert 22 to sleeve assembly 25, and further include a resilient contact section 44 to contact the shielding jacket 28. When the housing assembly 16 is connected to the outer tube, a flange 45 of plastic frame 17 concentric with bore 24 extends through opening 29 of outer tube 14, and the engaging means of the contact assembly 26 extends through opening 29 of outer tube within flange 45 and toward the inner tube 12. The contact assembly 26 has a first end 32 and an opposite second end 33. The second end 33 of the contact assembly 26 is electrically connected to the fuel gauge either directly or by an electrical lead.

Figure 6:
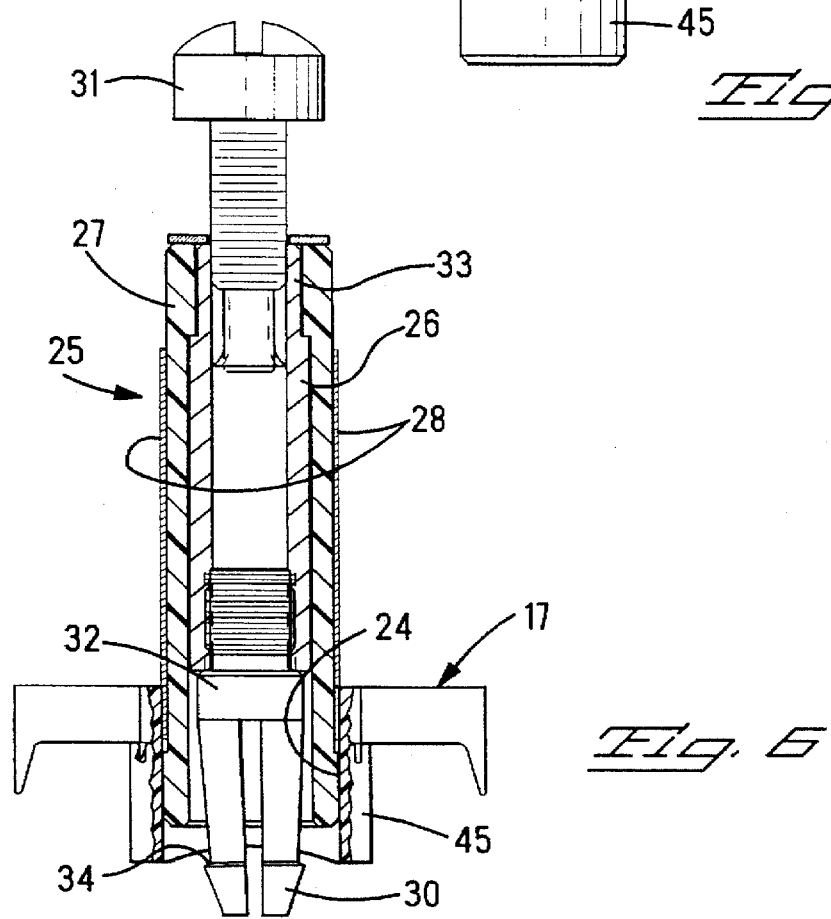
FIG. 6 is a partial cross-sectional view of the sleeve assembly of the present invention.
Figure 8:
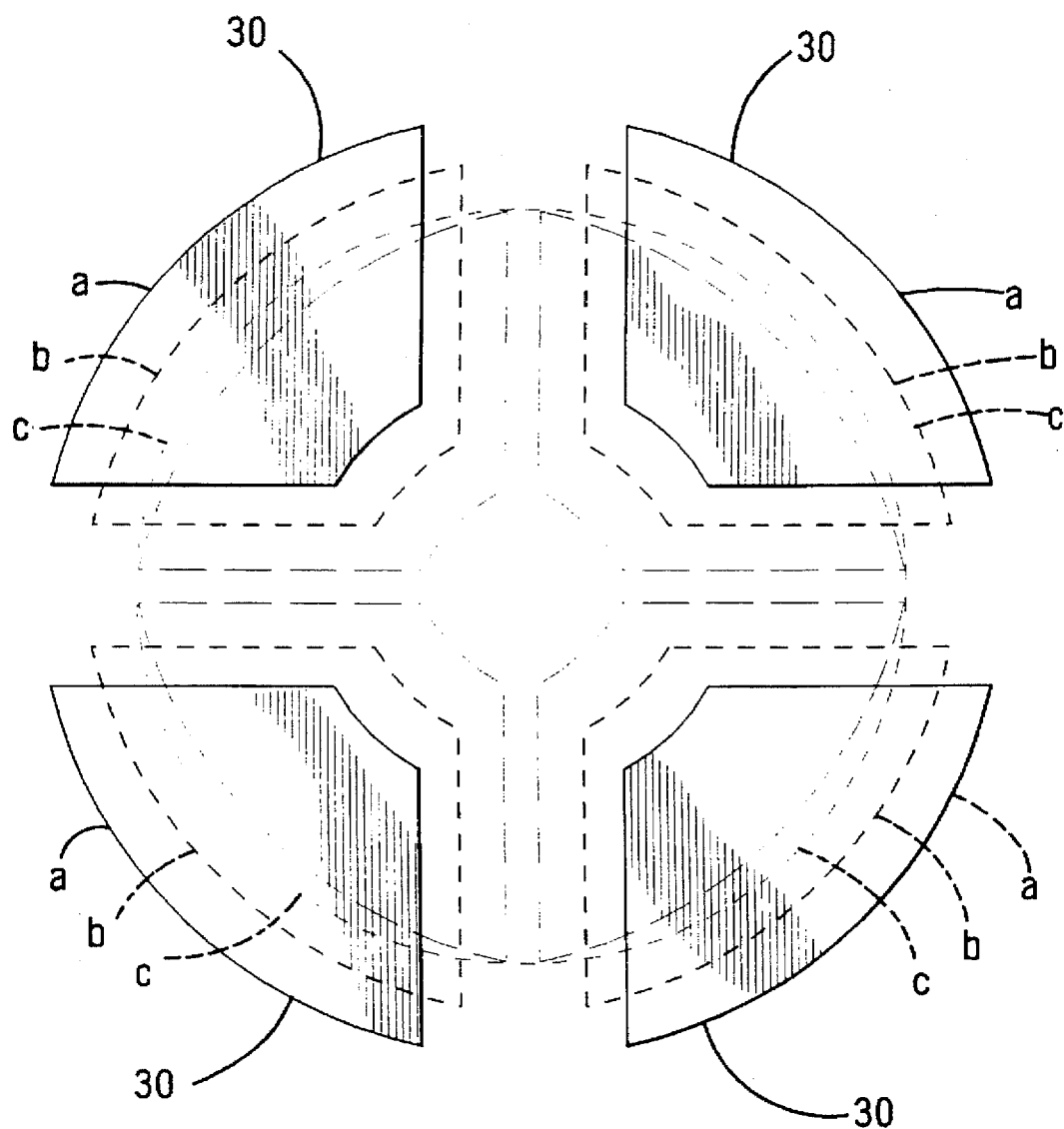
FIG. 8 is an end view showing fingers of engaging means on the sleeve assembly.

Referring to FIGS. 6 and 7, the first end 32 of the contact assembly 26 is connected to the engaging means. The engaging means, preferably, has at least two fingers 30 and optionally four formed thereon, each finger being resilient. Each finger 30, further has a shoulder 34 formed thereon with a tapered portion from the shoulder 34 toward the narrower end of the finger 30. An opening 35 is formed in the inner tube 12 such that the opening 35 in the inner tube 12 is aligned with the opening 29 in the outer tube 14. In this manner, moving the contact assembly 26 outwardly from the bore 24 and toward the inner tube 12, disposes the first end 32 of the contact assembly 26 in the opening 35 in the inner tube 12 such that the shoulders 34 extend beyond the inner wall 37 of the inner tube 12 to engage the inner tube 12. FIG. 7 illustrates in phantom the deflected position of a finger 30 when being inserted through opening 35. FIG. 8 shows three positions for the fingers 30. Position "a" is the rest position, position "b" is the engaged position and position "c" is maximum deflection. Thus, removal of the contact assembly 26 from the inner tube 12 is difficult and can be achieved only by the application of considerable force to obtain maximum deflection of the fingers 30.

The contact assembly 26 makes electrical contact with the inner tube 12 through the engaging means (fingers) 30, and an electrical cable 50 (FIG. 7) completes the electrical circuit between the inner tube 12 and the fuel gauge. The connection screw 31 is disposed on the opposite end 33 of the contact assembly 26 and is connected to the contact assembly 26. The screw 31 permits easy connection of the electrical lead 52 using a conventional spade terminal 53 (FIG. 7) terminated onto the end of lead 52. The portion of the contact assembly 26 above the shoulder 34 and distal from the first end 32, is tapered, being narrower immediately adjacent to the shoulder 34 and being wider toward the second end 33. This structure assists in retaining the contact assembly 26 in the opening 35 in the inner tube 12 and restricts movement of the contact assembly 26 through the opening 35 and into the inner tube 12. Together with the resiliency of the fingers 30, movement of the contact assembly 26, caused by vibration, is virtually eliminated.

The contact assembly 26 may be slidably movable for a distance which is equal to, or greater than, the space between the inner tube 12 and the outer tube 14. As shown in FIGS. 9–14, the relative diameters of the inner tube 12 and the outer tube 14 may vary and the distance between the tubes will vary accordingly. A large diameter outer tube 14 may have a small diameter inner tube 12 in which case, the contact assembly 26 must slide a greater distance in the bore 24 in the housing assembly 16 in order to engage the opening 35 in the inner tube 12. The versatility of the present connector permits use with inner 12 and outer 14 tubes having any combination of respective diameters.

An electrical lead 51 is connected between the outer tube 14 and the fuel gauge so that the fuel gauge can measure an electrical signal between the inner tube 12 and the outer tube 14. The electrical lead 51 may be connected to the outer tube 14 by a screw 20 received in the outer tube contact 19. It is preferred that the capacitance between the tubes be the signal which is measured and indicated as the amount of fuel which is present.

Due to the vibration and violent movement which the aircraft undergoes in normal flight, the connector is also provided with a retaining means such as retention clips 21, 23 to hold the electrical leads cables 50,51. The retaining means may be a spring, a snap, a clip (such as clips 21,23) or other restraining means and preferably are part of the housing assembly 16. Additionally, the leads cables 50,51 have grounding means such as a connector 54 terminating the outer conductor of each cable. The grounding clip 23 with its body section and contact section is to reduce any stray capacitance between the leads which might distort the signal to the fuel gauge.

Figure 3:
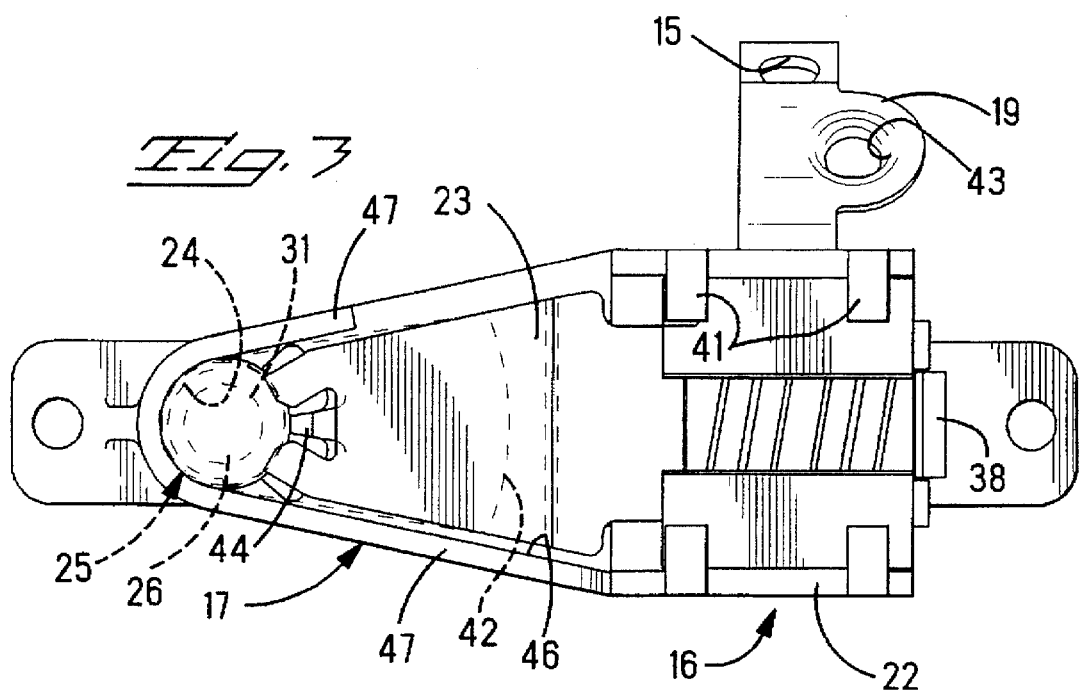
FIG. 3 is a top plan view of the housing assembly of the present invention, with the movable sleeve assembly shown in phantom.

A wing 42 is formed and, for stabilization, is disposed abutting the contact assembly 26 connection as shown in FIGS. 3 and 7. The wing 42 is disposed in a channel 46 in the plastic frame 17 formed between wall sections 47, and contacts the channel when the screw 31 is turned in either a clockwise or a counterclockwise direction. Thus, torquing of the screw 31 is permitted while preventing the contact assembly 26 from turning.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A connector for a fuel gauge in a fuel cell where the fuel gauge is of the type having an inner tube and a spaced-apart concentric outer tube, and a spacing formed between the walls of each tube, comprising:

a housing mountable to an outer surface of the outer tube and having conductive sections respectively electrically connectable to the outer and inner tubes and also connectable to the fuel gauge;

said housing includes a bore therethrough alignable with a corresponding opening through the wall of the outer tube, and an inner contact assembly mounted within said housing bore to extend beyond said housing and through said outer tube opening; and said inner contact assembly includes a first end and a second end, wherein said inner contact assembly is movable with respect to said housing for becoming electrically engaged with the wall of the inner tube wherein said second end would be exposed outwardly of the wall of the outer tube for being electrically connected to the fuel gauge, said inner contact assembly being the conductive section connectable to the inner tube.

2. The connector of claim 1 wherein said housing is an assembly including an insulative frame adapted to clamp to a pair of electrical cables, said housing further including a contact configured to electrically connect one of the cables to the outer tube, said contact being the conductive section connectable to the outer tube.

3. The connector of claim 2 wherein a sleeve assembly contains said inner contact assembly and is mounted in said bore, and said first end includes at least two resilient fingers having ends receivable into, and securable in, an opening formed in the inner tube to form an electrical connection with the inner tube, said finger ends having shoulders thereon insertable through the opening in the inner tube to resist removal therefrom, and said sleeve assembly being slidably movable a distance in said bore sufficient for said finger ends to be inserted through the opening of the inner tube.

4. The connector of claim 2 wherein said housing further includes at least two retention sections adapted to receive thereinto and retain therein a respective one of said electrical cables.

5. The connector of claim 4 wherein said at least two retention sections are defined by respective conductive clips mounted to said insulative frame, and one of said conductive clips includes a portion connecting one of said cables to said contact, and a second of said conductive clips includes a body section shielding against stray capacitance, the other of said cables extending beyond a shield of the cable to an electrical connection to said inner contact assembly.

6. The connector of claim 5 wherein each said conductive clip includes a pair of cable-receiving sections, said cable-receiving sections disposed along opposite sides of said insulative frame to permit securing respective said electrical cables therealong irrespective of the orientation of said housing on the outer tube.

7. The connector of claim 5 wherein an insert is affixable to said insulative frame remote from said inner contact assembly to secure said contact and said conductive clips to said insulative frame, with said one of said conductive clips being secured by said insert to said insulative frame in a manner establishing an electrical connection to said contact.

8. The connector of claim 5 wherein an insulative sleeve assembly contains said inner contact assembly and is disposed in said bore of said insulative frame and is movable therealong to establish an electrical connection of said first end of said inner contact assembly with said inner tube, and includes a shield therearound, and said second of said conductive clips includes a contact section adapted to engage an exposed portion of said shield of said inner contact assembly at any location of said sleeve assembly along said bore.

9. A method of assembling the connector of claim 2, comprising the steps of:

forming said opening in the wall of the outer tube, and forming an opening in the wall of the inner tube such that the openings are aligned with respect to one another, mounting said housing on the outer wall of the outer tube, with a flange of said frame being received in the opening in the outer tube, and slidably moving said inner contact assembly in said bore toward the inner tube until said first end of said inner contact assembly is inserted through the opening in the inner tube and engages in the inner tube, electrically connecting one of said cables to the second end of said inner contact assembly, and electrically connecting the other of said cables to said contact.

10. A connector for connecting an inner metal tube and an outer metal tube spaced concentrically with respect to one another, to a fuel gauge, comprising:

a housing mountable to the outer metal tube, said housing having a conductive portion connectable to the outer tube, said housing also having a section for disposition in an opening in the outer metal tube; and a contact assembly movably mounted in said section and having an inner contact member for electrical connection with the inner metal tube and an outer contact member for electrical connection to the fuel gauge.

11. A connector as claimed in claim 10, wherein said section includes a bore in which said contact assembly is movably mounted.

12. A connector as claimed in claim 11, wherein said contact assembly includes an insulating sleeve, a shield member mounted on said insulating sleeve, said inner and outer contact members being mounted in said insulating sleeve.

13. A connector as claimed in claim 12, wherein said inner contact member comprises at least two resilient fingers having ends receivable into springable engagement with an opening formed in the inner metal tube.

* * * * *